United States Patent [19]
Okpisz et al.

[11] Patent Number: 6,122,692
[45] Date of Patent: Sep. 19, 2000

[54] METHOD AND SYSTEM FOR ELIMINATING ADJACENT ADDRESS COLLISIONS ON A PIPELINED RESPONSE BUS

[75] Inventors: Alexander Edward Okpisz; Thomas Albert Petersen, both of Austin, Tex.

[73] Assignee: International Business Machines Corporation, Armonk, N.Y.

[21] Appl. No.: 09/100,353

[22] Filed: Jun. 19, 1998

[51] Int. Cl.[7] .......................... G06F 13/00; G06F 13/376
[52] U.S. Cl. ........................ 710/107; 710/36; 710/109; 710/126; 710/220; 710/240
[58] Field of Search .................... 710/127, 126, 710/128, 109, 107, 220, 240, 268, 36, 28, 29, 110, 113, 40, 119; 712/216, 219; 364/240.4, 241.2

[56] References Cited

U.S. PATENT DOCUMENTS

| | | |
|---|---|---|
| 4,714,990 | 12/1987 | Desyllas et al. . |
| 4,785,394 | 11/1988 | Fischer . |
| 4,791,557 | 12/1988 | Angel et al. . |
| 4,958,271 | 9/1990 | Yoshida et al. .......................... 710/128 |
| 5,099,421 | 3/1992 | Buerkle et al. . |
| 5,226,127 | 7/1993 | Fu et al. . |
| 5,463,762 | 10/1995 | Krein et al. . |
| 5,555,382 | 9/1996 | Thaller et al. . |
| 5,778,245 | 7/1998 | Papworth et al. .......................... 712/23 |

*Primary Examiner*—Ario Etienne
*Attorney, Agent, or Firm*—Anthony V. S. England; Felsman, Bradley, Vaden, Gunter & Dillon, LLP

[57] ABSTRACT

Described is an apparatus for eliminating early retrying of PAAM address conflicts on a system bus with multiple processors connected by a non-master processor, by comparing addresses of the current master processor to the next transaction to be issued by the non-master processor. If the addresses are the same and a PAAM window is detected, the non-master processor will switch the next transaction type to be issued, to a null type transaction. Even though the addresses match, the PAAM window is ignored for a null type transaction. The null transaction type insertion by the non-master processor reduces the latency of a PAAM self retried operation and avoids a possible livelock condition by breaking the processors out of the livelock. This allows the processors to stop retrying and leave the bus. The processors are able to immediately arbitrate instead of delaying past the astat window and increasing bus latency.

20 Claims, 8 Drawing Sheets

METHOD AND SYSTEM FOR ELIMINATING ADJACENT ADDRESS COLLISIONS ON A PIPELINED RESPONSE BUS

BACKGROUND OF THE INVENTION

1. Technical Field

The present invention relates in general to data processing systems with multiple processors and in particular to system bus arbitration between processors. Still more particularly, the present invention relates to bus arbitration involving a Previous Adjacent Address Match ("PAAM") detection function and early retrying of PAAM address collisions.

2. Description of the Related Art

Data processing systems are constantly being improved through improved efficiency and increased transaction throughput. Generally, areas of development for increased throughput are: the use of multiple processors within a data processing system; using Reduced Instruction Set Computer ("RISC") processors and incorporating high speed memory caches in the processors.

A RISC processor operates by using only a small set of basic commands for fundamental computer operations. The objective of a RISC processor design is to use only the most frequently used instructions of the overall instruction set. By reducing the number of instructions to an optimal few, the circuitry of the processor is simplified and the speed f execution of each instruction is increased.

Performance capabilities in data processing systems using RISC processors are enhanced further by installing additional RISC processors in the system. The RISC processors can be configured to multi-task or to parallelize transactions and run several applications simultaneously; dramatically improving the throughput and performance of the system.

RISC processors further improve throughput by employing multiple instruction execution units within the processor allowing out of order execution. Cache memories within the RISC processor, usually two, are generally very fast. When accessing memory for data or instructions, the processor usually queries the first level of cache memory (L1), which is very fast but has a small capacity. A second level of cache memory (L2) is the second choice of the RISC and is larger than L1, but is slower. L1 and L2 memory is usually located on or very near the processor. If the required instruction or data is not found in either L1 or L2, the main memory, which has a large capacity, is accessed via a system bus. Data is usually pre-fetched from the main memory and stored in the relatively fast L1 or L2 cache memory to save processing time. As long as the processor accesses data from cache memory, the overall operating speed of the processor is maintained at a higher level than would be possible if the processor was required to access the main memory for required information. Further, the processors would have to arbitrate for control of the bus (system bus), connecting the processors to the main memory, for each data access, thereby consuming more processing time.

Data needed by a particular processor in a multiple processor data processing system usually has a low probability of being in that particular processor's cache memory. So, there will be a high level of data traffic on the system bus between system memory and processor caches. All the processors being connected to the system memory by the system bus, produces many different operations, or transactions, on the bus at the same time.

In a multiple processor data processing system, several system bus arbitration and timing problems may arise. In data processing systems where the processors are using a pipelined system bus, one transaction (also referred to as "operation") may have the same address as that of a "previously immediate adjacent operation"—that is, the two operations are close enough in time when attempting to access the same address that they could affect each other. If the address of the previously immediate adjacent operation matches that of the current operation and the two transactions have collidable types, then the two operations will collide. In these situations, the current operation processor will cancel its own operation on the bus by asserting retry signals.

A PAAM window is measured, in cycles, from the point in time that a processor first snoops an address on the system bus, to the point the processor knows that the master of the snooped address has received a response. The window can vary depending on the response time of responding devices on the system bus. The longer the response time, the higher the probability that a processor will retry its own transaction due to a PAAM collision the more retries required by a processor, operating on the system bus, to pass the PAAM window so as to avoid a collision.

Figure 6A:
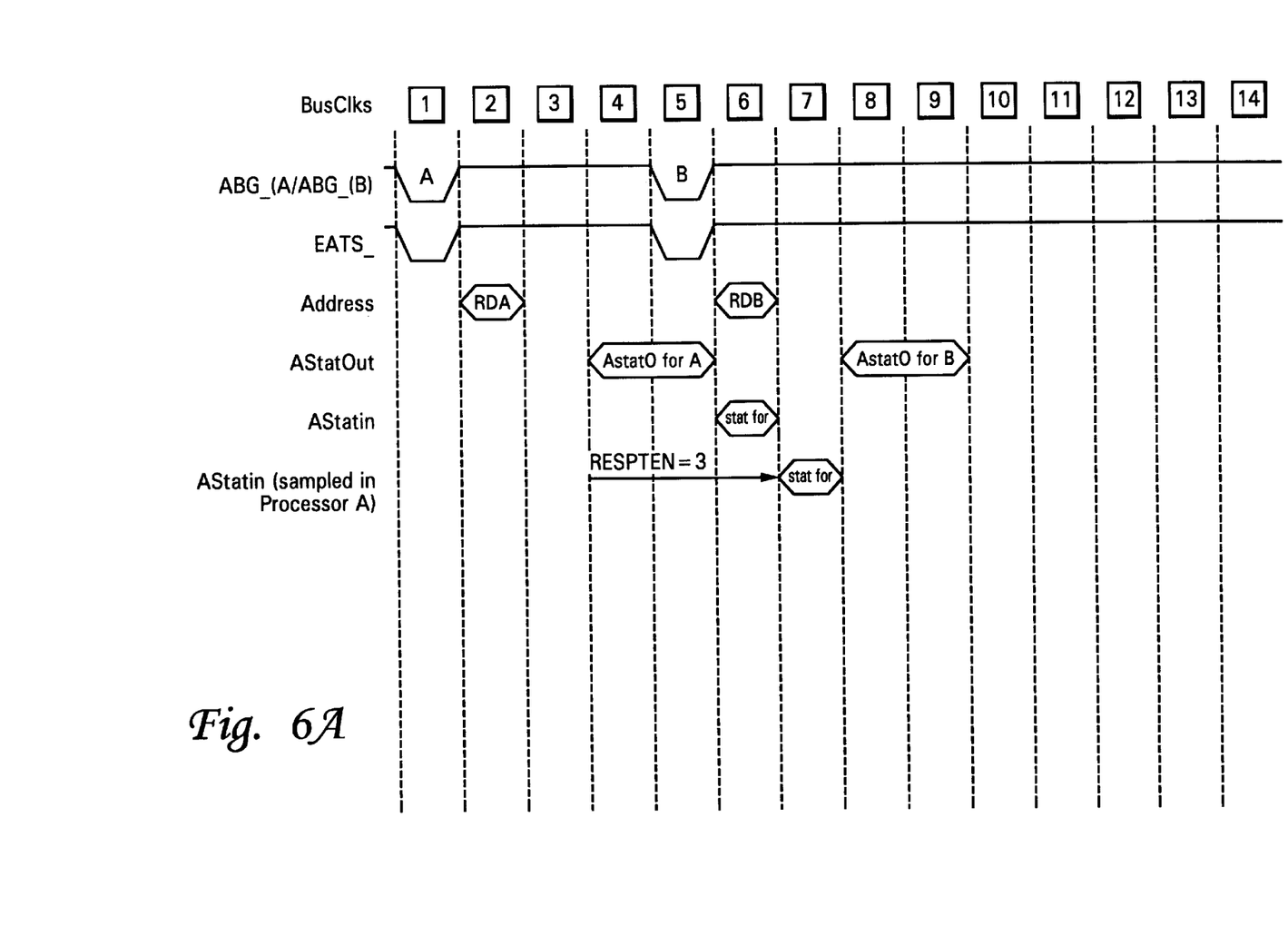
FIGS. 6A–6C are prior art timing wave form diagrams illustrating three sequences for the relationship in time between RDA and RDB.
Figure 6B:
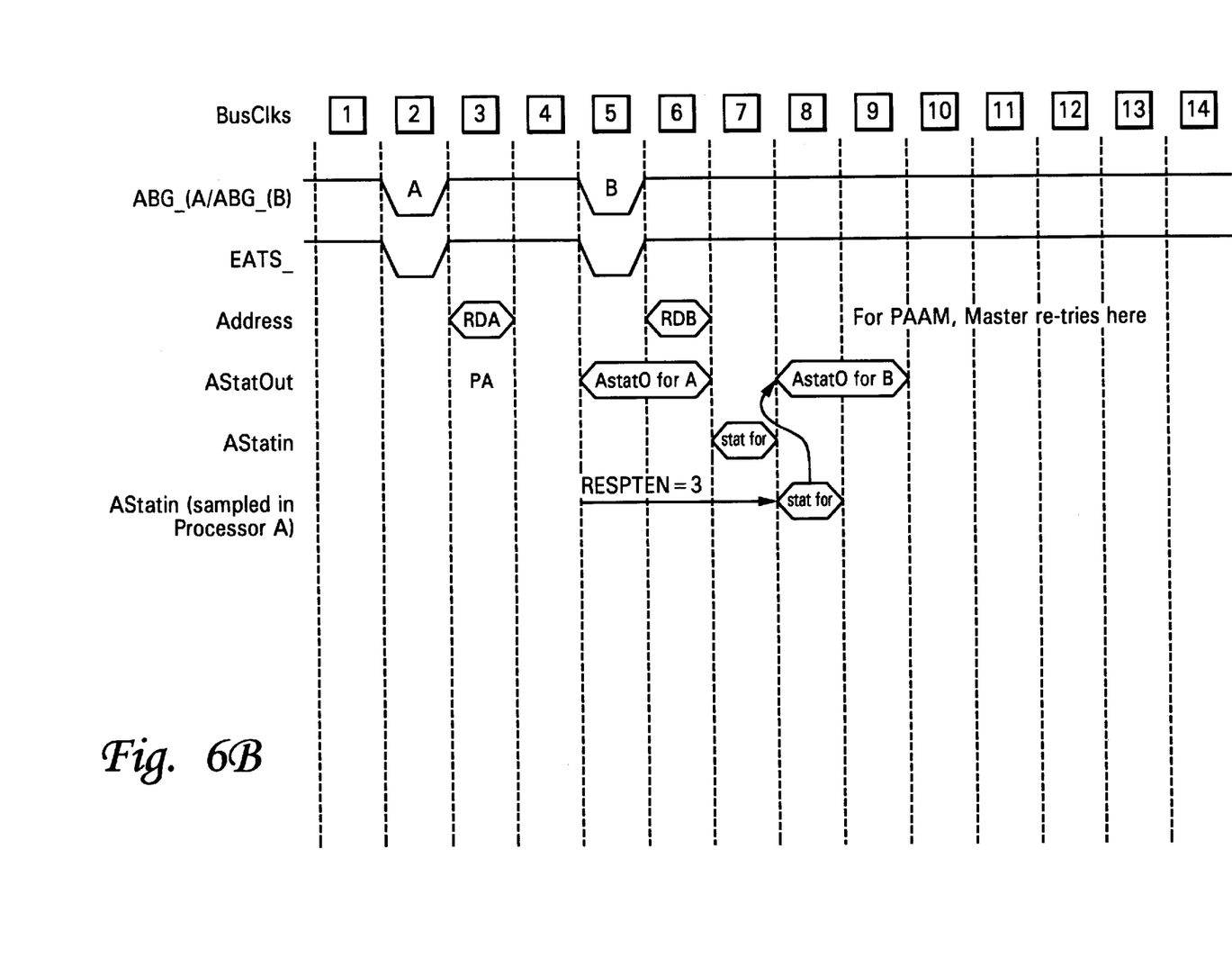
Figure 6C:
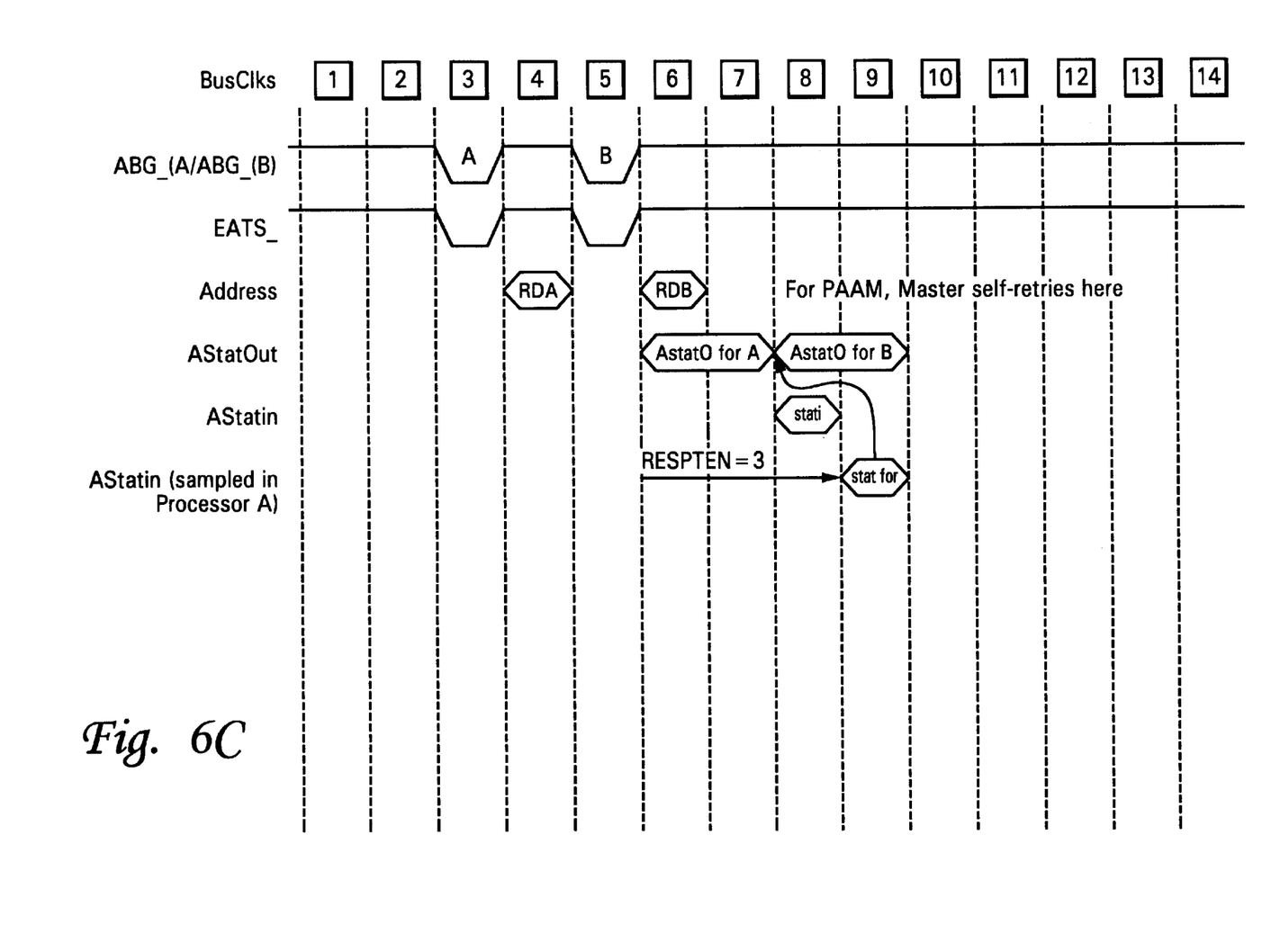

FIGS. 6A–C is a timing wave form diagram of a problem caused by a PAAM window. Terms indicated in FIGS. 6A–C are defined as follows: ABG_A/ABG_B—Address Bus Grant for processor A and Address Bus Grant for processor B (The signals illustrated are arbitrating signals used by the System Controller to inform a processor that it is granted mastery of the system bus. For example, processor B is granted bus mastery in clock cycle 5 (the clock cycles are indicated in the boxes above the columns.); EATS—Early Address Transfer Start informs the slave devices on the system bus to read the address on the system bus; Address— the targeted address of a particular processor; Transaction Type—the class of transaction such as a general load, store, or cache operation; AStatOut—Address Status Out signal, issued from a slave device on the bus, is early status information on the bus such as a busy or early retry signal; AStatin—Address Status In is a signal into the Master indicating early status information coming in, such as busy or early retry; RDA—shows a potentially interfering transaction driven by processor A. RDB—represents a read operation driven by processor B.

In these diagrams, two processors, processor A and processor B, are using a pipelined system bus. An operation initiated by processor B may collide with a previously immediate adjacent operation by processor A. Collide, in this instance, means that processor B snoops the target address of processor A to determine if the addresses are the same. If the two operations collide in a PAAM window, processor B will cancel its own operation by asserting retry signals in the appropriate window.

The timing wave form diagrams illustrated in FIGS. 6A–6C show three different sequences for the relationship in time between RDA and RDB. The timing wave form in Figure A, illustrates non-colliding transactions. In this sequence, processor A receives the response to RDA in cycle 7 and is able to feed it into the response to transaction B (AstatO at cycle 8.

The wave forms in FIGS. 6B and 6C, illustrate similar collision sequences. A discussion of FIG. 6C is illustrative of FIG. 6B. The timing wave form diagram in FIG. 6C illustrates a PAAM collision and is interpreted as follows: at cycle 4, processor A outputs address A. At cycle 6, processor B outputs address B. Processor B checks the signals (RDB) on the bus three cycles back, compares target addresses with processor A and determines that processor B's target address matches that of processor A. The response has not yet been returned to processor A, so the status of address A is not known by either processor. Processor B has to retry because the assumption is that processor A's snoop, or "read" in this case, will get a positive response and the address will not be available for Processor B. The address response, Astatin, in cycle 8 is the response by the slave, or bus device, for processor A. Astatin information is not available to processor A until cycle 9. The collision occurs since processor A should have transmitted the new response information in its response to processor B's RD at cycle 8. The collision is shown by the head of the curved arrow.

Figure 5:
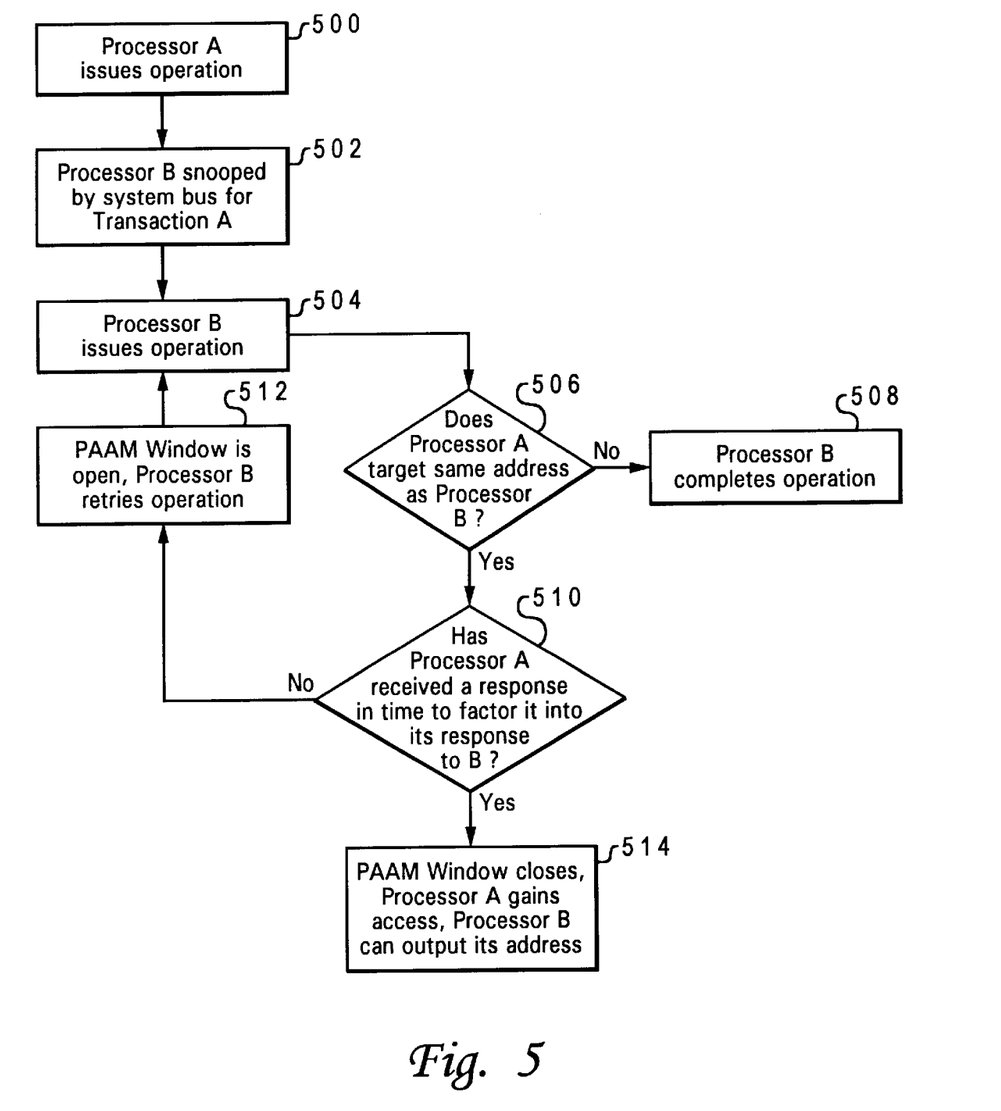
FIG. 5 depicts a prior art high level flow diagram of the PAAM window problem.

FIG. 5 depicts a high level flow diagram of the PAAM window problem as described above and in FIGS. 6A–C. The process begins in step 500, which depicts processor A issuing an operation to the system bus. Next the process proceeds to step 502, which illustrates processor B being snooped by the system bus for transaction A. The process then proceeds to step 504, which depicts processor B issuing its operation. The process next passes to step 506, which illustrates determining whether processor A's target address is the same as the target address for processor B. If the addresses are not the same, the process proceeds to step 508, which illustrates processor B completing its operation. If the targeted address of processor A and processor B are the same, the process instead proceeds to step 510, which depicts determining whether processor A has received a response from a device (slave) on the system bus in time to factor the response into the response to processor B. If there has been no response received, the process passes to step 512, which illustrates the PAAM window open and processor B retrying the operation. Processor B is still trying to gain access to the targeted address but at this point, confirmation of processor A having received the address has not been received. Therefore, processor B may be able to access the address and the process proceeds next to step 504 and repeats the cycle. If processor A receives a response in step 510, the process proceeds instead to step 514, which depicts the PAAM window closing and allowing processor A to gain access to the target address thus, freeing processor B to output its address.

In processors using a pipelined system bus, such as the PowerPc™ processors (620 and 630FP) available from IBM Corporation of Armonk, New York, the operation detecting PAAM, in this case processor B, waits for its astat window until it can re-arbitrate on the bus. The wait for the astat window—for processor B to self retry—incurs two disadvantages. The first disadvantage includes the number of cycles involved in waiting for the astat window to cancel the operation. Generally, the processors connected to the system bus are much faster than the system bus. As the ratio between the processor speed and bus speed grows, this delay becomes very significant. In the present example, the delay would be meaningful if processor B is stalled for five bus cycles or 10 processor cycles in a system with two processor cycles per bus cycle. Ten processor cycles is significant, especially when the processor is capable of two operations per cycle.

Figure 4:
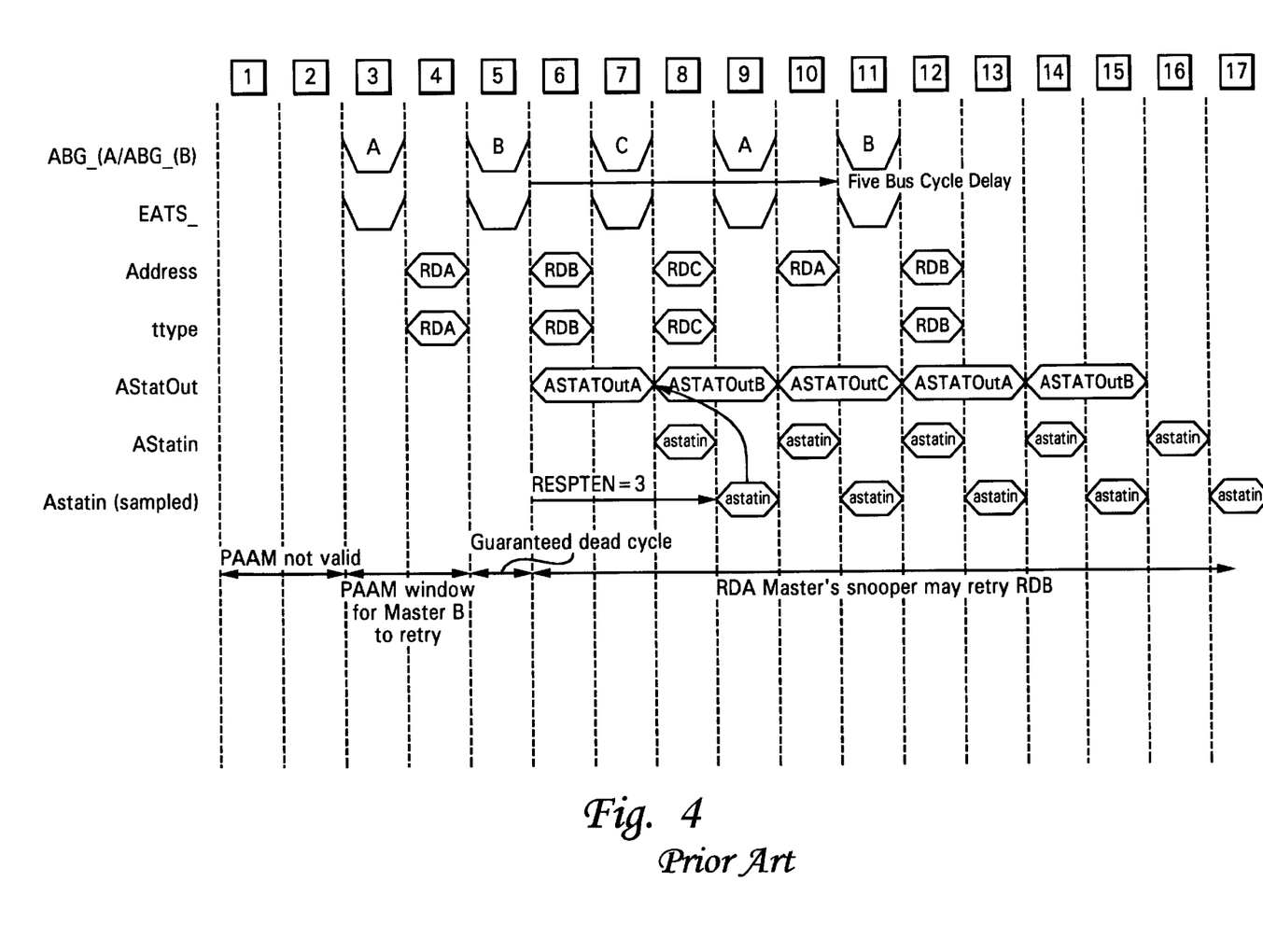
FIG. 4 is a prior art drawing illustrating multiple processors in arbitration for the system bus, causing a livelock condition.

A second disadvantage caused by the wait for self retry involves a possible "livelock" condition, where multiple processors try to access the same address on the bus all at the same time. For instance, FIG. 4 illustrates multiple processors in arbitration for the system bus, causing a livelock condition. In this example, processor A receives Astatout (early status information from slave) early retry for some other reason than PAAM, such as a full snooper. Processor B receives PAAM (astatin not known by processor A or B yet) on processor A's address so processor B will (Astatout) early retry itself. Processor A comes back with its address but detects PAAM (astatin not received by processor C yet) because of processor C, and processor A will (Astatout) early retry itself.

In a livelock condition, all three processors; A, B and C are trying to gain access to the same address at the same time and they continue to retry in a ping pong fashion, first one, then the other. All are trying to access the address but because of the PAAM window and the need to retry, livelock occurs and though the processors are working, no useful work is done. The PowerPc™ 620 attempts to solve a livelock condition by delaying early retried operations to push past the PAAM window, either for a random period or for a fixed number of bus cycles before retrying. The extra delay clears up the livelock condition but adds to the five bus cycle latency already experienced by PAAM retried operations. So, even though the livelock condition is terminated, the solution adds delay and inefficiency.

It would be desirable, therefore, to eliminate early retrying of PAAM window collisions, reduce bus cycle latency and prevent or break up a possible livelock condition.

SUMMARY OF THE INVENTION

It is therefore one object of the present invention to provide a means for eliminating retrying of operations during a Previous Adjacent Address Match window collisions.

It is another object of the present invention to provide a means to reduce bus cycle latency for the Previous Adjacent Address Match operation.

It is yet another object of the present invention to provide a means that will prevent or break up a livelock condition.

The foregoing objects are achieved as is now described. The apparatus eliminates early retrying of PAAM address conflicts on a system bus with multiple processors connected by a non-master processor, by comparing addresses of the current master processor to the next transaction to be issued by the non-master processor. If the addresses are the same and a PAAM window is detected, the non-master processor will switch the next transaction type to be issued, to a null type transaction. Even though the addresses match, the PAAM window is ignored for a null type transaction. The null transaction type insertion by the non-master processor reduces the latency of a PAAM self retried operation and avoids a possible livelock condition by breaking the processors out of the livelock. This allows the processors to stop retrying and leave the bus. The processors are immediately able to arbitrate instead of delaying past the astat window and increasing bus latency.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
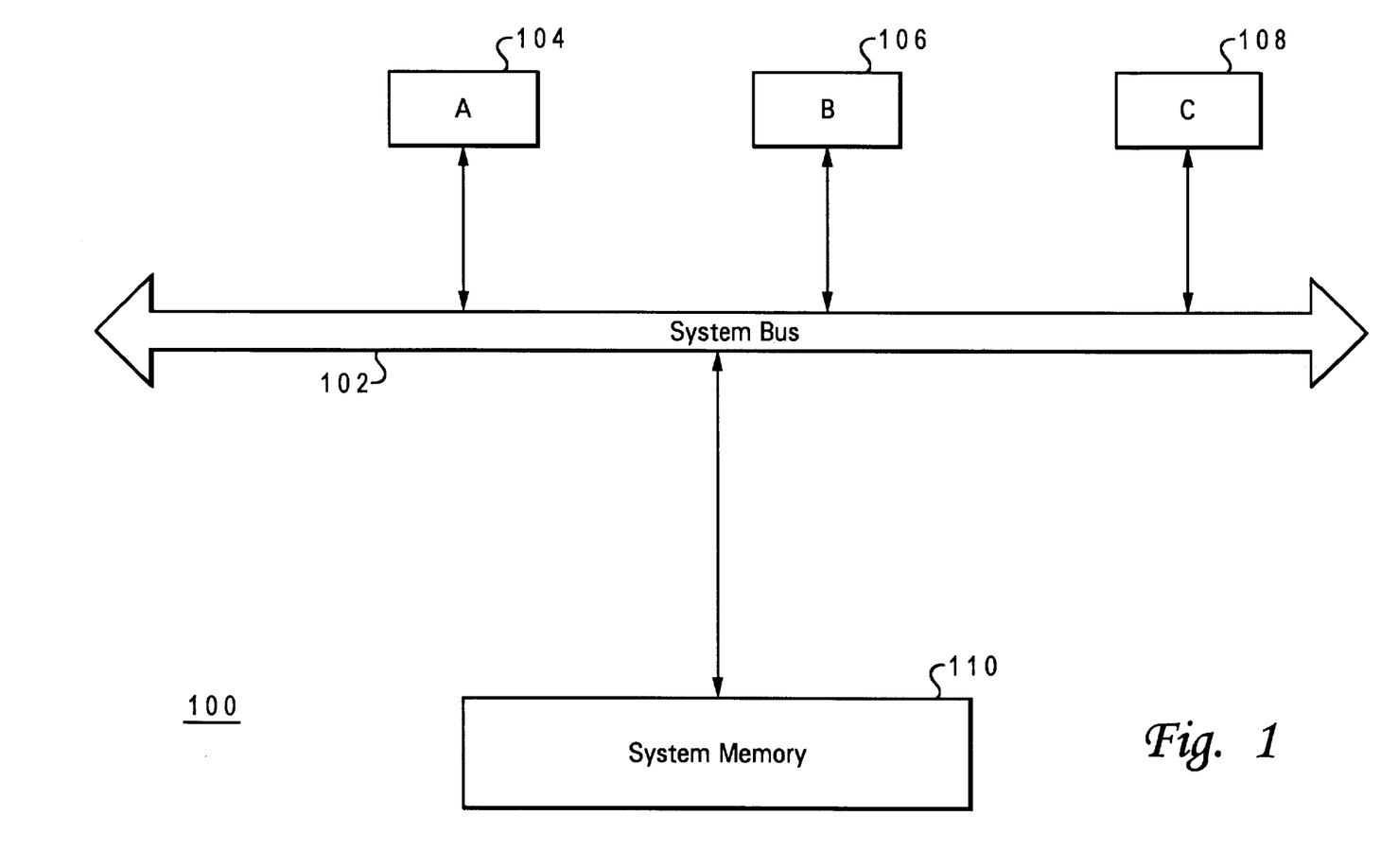
FIG. 1 depicts a high level block diagram of a data processing system in accordance with a preferred embodiment of sent invention.

With reference now to the figures, and in particular with reference to FIG. 1, a high level block diagram of a data processing system using multiple processors connected to a system bus, is depicted. Communication between processors A 104, B 106 and C 108 and system memory 110 on data processing system 100 takes place via system bus 102.

Each processor is a superscalar processor capable of issuing multiple instructions per clock cycle. Superscalar refers to the architecture of the processor and the use of multiple execution units that allow processing of more than one instruction at a time. Generally, processors execute operations faster than a system bus. During processing, there are many operations occurring on system bus 102 concurrently. Consequently, there are many instances that more than one processor targets a specific address within the system memory at the same time. If the address targeted by two processors is the same and is to be accessed by each processor at the same time, the operation initiated by the second processor is cancelled and repeated, or retried.

Arbitration is started when a processor needs system bus 102 to access system memory 110. Mastery of system bus 110 is granted to a particular processor, processor A 104 for example, and processor A 104 attempts to read an address in system memory 110. A slave device (not shown) on system bus 102 returns a signal that informs processor A 104 whether the targeted address is available. The period, from the time processor A 104 queries system memory 110 until the availability of the specified address is returned, can be multiple clock cycles. During that period, a second processor, B 106 in this case, may output the same address causing the probability of a collision of operations. However, if processor A 104 is the master of system bus 102, processor B 106 will retry its own address even though there is no notice of availability of that address. Processor B 106 retries because the address has not been assigned to processor A 104 and may not be assigned. Even so, the address does not become available until assigned and processor B 106 will retry until the address is assigned to processor A 104 or rejected.

Processor C 108 may also arbitrate for system bus 102 and target the same address as processor A 104 and processor B 106. Processor C 108 makes address comparisons as well and is subject to collisions just as processor A 104 and processor B 106. A problem incurred by the third processor being involved is a called a 'livelock' condition—due to each processor trying to access the same address, they continue trying with none being successful. The processors continue to retry until interrupted.

Figure 2:
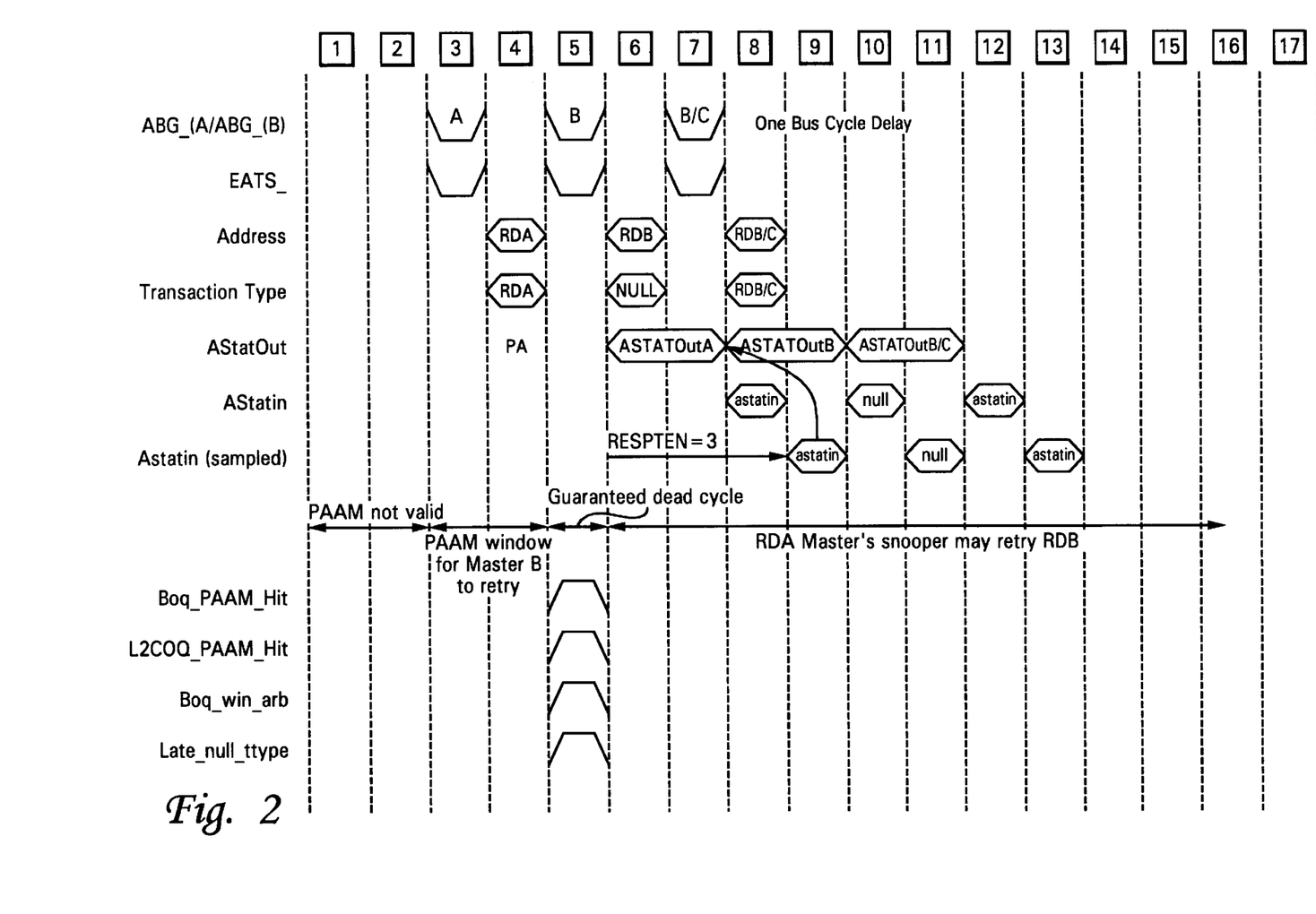
FIG. 2 is a timing wave form diagram in accordance with a preferred embodiment of the present invention.

In FIG. 2, a timing wave form diagram in accordance with a preferred embodiment of the present invention, is depicted.

The following additional labels indicated in FIG. 2 are defined as follows: Boq_PAAM_Hit is the incoming address from the system bus matching an outgoing load operation from the bus outstanding queue; L2COQ_PAAM_Hit is the incoming address from the bus matching an outgoing store operation from the L2 cast out queue; boq_win_arb is a signal indicating the bus outstanding queue winning arbitration for the bus; Late_null_type is the signal for sending out the null transaction type.

As shown in FIG. 2, processor A and processor B are driving the system bus in cycle 4 and cycle 6 (see RDA and RDB). However, in this example processor B has compared the targeted addresses of processor A and processor B's operations and determined that RDA (previously defined) and RDB (previously defined) are the same. Processor A has not received astatin confirmation that the targeted address is available, so processor A is waiting for a response and processor B normally would continue to retry. However, as shown in FIG. 2, rather than issue a load or store operation, processor B issues a NULL Transaction Type.

A PAAM window opens with the RDA address read and to avoid the PAAM collision for subsequent addresses, a NULL Transaction Type is inserted in cycle 6, as illustrated in FIG. 2. The insertion of a NULL Transaction Type causes the processors to ignore the RDA address for PAAM collision. However, if the response is delayed long enough, multiple NULL Transaction Types may be needed to pass the PAAM window. The term for the time between processor B sending an operation out a second time after receiving a collision due to the PAAM window, is bus latency. In this example, processor B receives the bus in cycle 8 rather than cycle 12 since a NULL Transaction Type was inserted in cycle 8. The bus latency is one bus cycle as opposed to a normal bus latency of five bus cycles if processor B retried itself. If processor C receives the bus in cycle 8, it won't have to retry for the same reason; PAAM is ignored for a null transaction type.

Also, the NULL Transaction Type breaks any livelock condition (previously discussed), allowing retried operations to immediately re-arbitrate instead of waiting for the PAAM window to pass. If the addresses match, as compared between a bus incoming address and the bus outgoing address, the PAAM is valid. If the bus incoming transaction type is a general load, store, or cache operation and the addresses match, the processor switches the transaction to a NULL Transaction Type and defeats the PAAM window.

Figure 3:
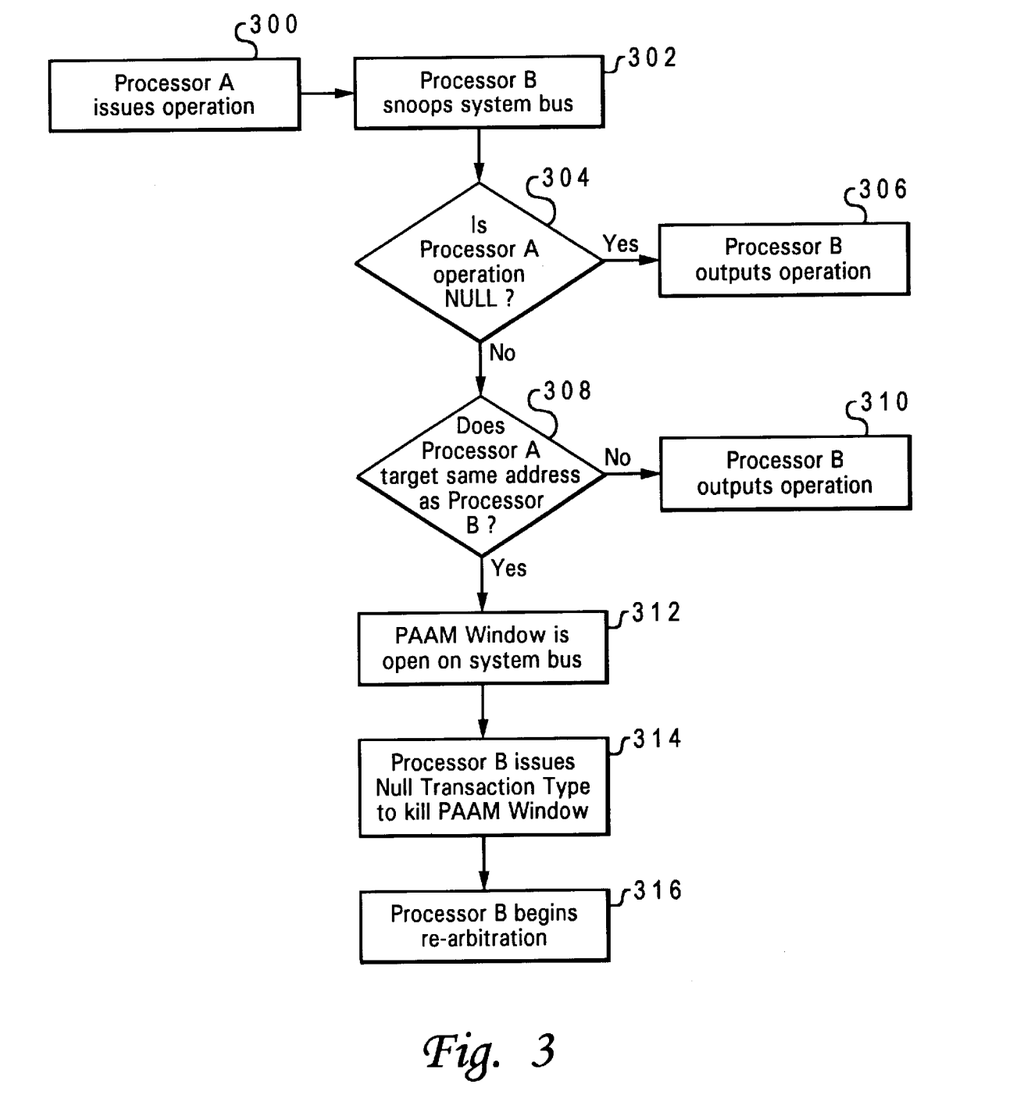
FIG. 3 depicts a flow diagram depicting the timing wave form in FIG. 2 in accordance with a preferred embodiment of the present invention.

Turning now to FIG. 3, a high level flow diagram in accordance with a preferred embodiment of the present invention, is depicted. FIG. 3 is best understood by reading FIG. 2 in concert with FIG. 3. The process begins in step 300, which depicts processor A, as bus master, issuing an operation on the system bus. The process proceeds to step 302, which illustrates processor B snooping the system bus for an address. The process next passes to step 304, which depicts determining whether processor A's operation is a NULL transaction. If so, the process proceeds to step 306, which illustrates processor B outputting its operation. If processor A's operation is not a NULL transaction, the process proceeds instead to step 308, which depicts determining whether processor A is targeting the same address as processor B. If not, the process passes to step 310, which illustrates processor B outputting its operation. If the processor A has the same targeted address as processor B, the process instead passes to step 312, which depicts a PAAM window open on the system bus causing processor B to continue to retry the targeted address. The process next proceeds to step 314, which illustrates processor issuing NULL transaction type to kill the PAAM window. The process then passes to step 316, which depicts processor B re-arbitrating for the system bus.

This procedure breaks the PAAM window and livelock conditions and allows the processors to begin re-arbitrating for the system bus.

While the invention has been particularly shown and described with reference to a preferred embodiment, it will be understood by those skilled in the art that various changes in form and detail may be made therein without departing from the spirit and scope of the invention.

What is claimed is:

1. A method for eliminating address collisions on a pipelined system bus, comprising:

snooping the system bus;

prior to requesting an impending operation having a non-null transaction type on the system bus, determining if the impending operation will collide with a previous operation already requested on the system bus and awaiting a response;

responsive to determining that the impending operation will collide with the previous operation, substituting a null transaction type for the non-null transaction type of the impending operation; and requesting the impending operation with the substituted null transaction type on the system bus.

2. The method in claim 1, wherein the step of snooping the system bus further comprises:

detecting a request for the previous operation.

3. The method in claim 1, wherein the step of snooping the system bus further comprises:

detecting an address for the previous operation.

4. The method in claim 1, wherein the step of determining if the impending operation will collide with a previous operation already requested on the system bus and awaiting a response further comprises:

determining if the impending operation and the previous operation have a same targeted address.

5. The method in claim 4, wherein the step of determining if the impending operation and the previous operation have a same targeted address further comprises:

comparing a bus operation incoming address for the previous operation to a bus operation outgoing address for the impending operation.

6. The method in claim 5, wherein the step of substituting a null transaction type for the non-null transaction type of the impending operation further comprises:

determining whether a transaction type for the previous operation is a non-null transaction type; and responsive to determining that the transaction type for the previous operation is a non-null transaction type, changing the non-null transaction type for the impending operation to a null transaction type.

7. The method in claim 1, wherein the step of determining if the impending operation will collide with a previous operation already requested on the system bus and awaiting a response further comprises: determining if a transaction type for the previous operation is a non-null transaction type.

8. A system for eliminating address collisions, comprising:

means for snooping for a system bus;

means for determining, prior to requesting an impending operation having a non-null transaction type on the system bus, if the impending operation will collide with a previous operation already requested on the system bus and awaiting a response;

means, responsive to determining that the impending operation will collide with the previous operation, for substituting a null transaction type for the non-null transaction type of the impending operation; and means for requesting the impending operation with the substituted null transaction type on the system bus.

9. The system in claim 8, wherein the means for snooping for a system bus further comprises:

means for detecting a request for the previous operation.

10. The system in claim 9, wherein the means for snooping for a system bus further comprises:

means for detecting an address for the previous operation.

11. The system in claim 8, wherein the means for determining if the impending operation will collide with a previous operation already requested on the system bus and awaiting a response, further comprises:

means for determining if the impending operation and the previous operation have a same targeted address.

12. The data processing system in claim 11, wherein the means for determining if the impending operation and the previous operations have a same targeted address further comprises:

means for comparing a bus operation incoming address for the previous operation to a bus operation outgoing address for the impending operation.

13. The system in claim 12, wherein the means for substituting a null transaction type for the non-null transaction type of the impending operation further comprises:

means for determining whether a transaction type for the previous operation is a non-null transaction type; and means, responsive to determining that the transaction type for the previous operation is a non-null transaction type, for changing the non-null transaction type for the impending operation to a null transaction type.

14. The system in claim 8, wherein the means for determining if the impending operation will collide with a previous operation already requested on the system bus and awaiting a response further comprises:

means for determining if a transaction type for the previous operation is a non-null transaction type.

15. A method of avoiding address collision retrys, comprising:

prior to issuing an address on a system bus for an impending operation having a non-null transaction type, determining whether a previous adjacent address issued on the system bus for a pending operation by a different device targets an address matching an address for the impending operation;

responsive to determining that the address for the pending operation matches the address for the impending operation, determining whether a transaction type for the pending operation is a non-null transaction type; and responsive to determining that the transaction type for the pending operation is a non-null transaction type, substituting a null transaction type for the non-null transaction type of the impending operation before issuing the address for the impending operation on the system bus.

16. The method of claim 15, wherein the step of determining whether a previous adjacent address issued on the system bus for a pending operation by a different device targets an address matching an address for the impending operation further comprises:

determining whether a response to a previously-detected request for the pending operation has been detected.

17. The method of claim 15, wherein the step of determining whether a previous adjacent address issued on the system bus for a pending operation by a different device targets an address matching an address for the impending operation further comprises:

comparing the previous adjacent address to the address for the impending operation.

18. The method of claim 15, further comprising:

responsive to determining that the transaction type for the pending operation is a null transaction type, issuing the address and the non-null transaction type for the impending operation on the system bus.

19. The method of claim 15, further comprising:

monitoring the system bus for a response to the pending operation; and responsive to detecting a response to the pending operation, issuing the address and the non-null transaction type for the impending operation on the system bus.

20. The method of claim 15, further comprising:

monitoring the system bus for a response to the pending operation; and prior to detecting a response to the pending operation, issuing the address and the substituted null transaction type for the impending operation on the system bus at each opportunity to issue the address for the impending operation on the system bus.

* * * * *